(12) United States Patent
Stolze et al.

(10) Patent No.: US 11,573,936 B2
(45) Date of Patent: Feb. 7, 2023

(54) METHOD FOR LOADING DATA IN A TARGET DATABASE SYSTEM

(71) Applicant: International Business Machines Corporation, Armonk, NY (US)

(72) Inventors: Knut Stolze, Hummelshain (DE); Reinhold Geiselhart, Rottenburg-Ergenzingen (DE); Felix Beier, Haigerloch (DE); Luis Eduardo Oliveira Lizardo, Böblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/021,072

(22) Filed: Sep. 15, 2020

(65) Prior Publication Data
US 2022/0050812 A1    Feb. 17, 2022

(30) Foreign Application Priority Data
Aug. 12, 2020  (EP) ..................................... 20190625

(51) Int. Cl.
*G06F 16/21*    (2019.01)
*G06F 16/25*    (2019.01)
*G06F 16/27*    (2019.01)
*G06F 16/22*    (2019.01)

(52) U.S. Cl.
CPC ........ *G06F 16/211* (2019.01); *G06F 16/2282* (2019.01); *G06F 16/254* (2019.01); *G06F 16/273* (2019.01)

(58) Field of Classification Search
CPC .............................. G06F 16/211; G06F 16/273
USPC ......................................................... 707/803
See application file for complete search history.

(56) References Cited

U.S. PATENT DOCUMENTS

| 8,666,956 | B1 * | 3/2014 | Ramesh | ............... | G06F 16/2477 |
| | | | | | 707/703 |
| 2006/0136443 | A1 | 6/2006 | Dulay | | |
| 2006/0212799 | A1 * | 9/2006 | Kamiya | ................ | G06F 40/143 |
| | | | | | 715/236 |
| 2009/0083341 | A1 * | 3/2009 | Parees | .................. | G06F 16/2365 |
| 2009/0248710 | A1 * | 10/2009 | McCormack | ......... | G06F 16/288 |
| 2010/0274759 | A1 | 10/2010 | Takeuchi | | |

(Continued)

FOREIGN PATENT DOCUMENTS

| CN | 108376171 A | 8/2018 |
| CN | 111427853 A | 7/2020 |

OTHER PUBLICATIONS

"Introduction to Multi-Version Concurrency Control (The Real Thing®)", Poor Men's Multi-Version Concurrency Control (MVCC), IDAA-Server Documentation, Last printed Sep. 10, 2020, 10 pages, <https://pages.github.ibm.com/Everest/IDAA-Server/#/concepts/mvcc>.

(Continued)

*Primary Examiner* — Muluemebet Gurmu
(74) *Attorney, Agent, or Firm* — Gilbert Harmon, Jr.

(57) ABSTRACT

The present disclosure relates to a computer implemented method for loading data in a target database system. The method comprises: determining that a load of a source table is expected to occur in the target database system. A future target table may be provided in advance in accordance with a defined table schema, and thereafter a load request for loading the source table may be received. Data of the source table may be loaded into the future target table.

16 Claims, 6 Drawing Sheets

(56) References Cited

U.S. PATENT DOCUMENTS

| | | |
|---|---|---|
| 2012/0124081 A1 | 5/2012 | Ebrahimi |
| 2012/0150791 A1* | 6/2012 | Willson ............... G06F 16/254 <br> 707/600 |
| 2013/0151491 A1* | 6/2013 | Gislason ............ G06F 16/2282 <br> 707/696 |
| 2014/0006342 A1* | 1/2014 | Love ..................... G06F 16/23 <br> 707/609 |
| 2014/0114924 A1* | 4/2014 | Abed ................. G06F 11/1451 <br> 707/675 |
| 2015/0200994 A1 | 7/2015 | Jain |
| 2016/0378645 A1* | 12/2016 | Giuliani ................. G06F 16/21 <br> 714/38.1 |
| 2017/0147672 A1 | 5/2017 | Arnold |
| 2018/0137186 A1* | 5/2018 | Brodt ................... G06F 16/275 |

OTHER PUBLICATIONS

Martin et al., "Near Real-Time Analytics with IBM DB2 Analytics Accelerator", EDBT 13: Proceedings of the 16th International Conference on Extending Database Technology, Mar. 2013, pp. 1-10 , <https://doi.org/10.1145/2452376.2452444>.

Stolze et al., "Autonomous Data Ingestion Tuning in Data Warehouse Accelerators", Business, Technologie und Web (BTW 2017), Computer Science, pp. 1-10.

Stolze et al., "Method for Loading Data in a Target Database System", P201911352EP01, Application No. EP20190625.2, Filed Date Aug. 12, 2020.

Stolze et al., "Partial Reload of Incrementally Updated Tables in Analytic Database Accelerators", Business, Technologie und Web (BTW 2019), doi:10.18420/btw2019-27, pp. 1-11.

"Patent Cooperation Treaty PCT Notification of Transmittal of the International Search Report and the Written Opinion of the International Searching Authority, or the Declaration", Applicant's file reference P201911352PCT01, International application No. PCT/IB2021/057375, International filing date Aug. 10, 2021, dated Aug. 12, 2021, 8 pages.

* cited by examiner

METHOD FOR LOADING DATA IN A TARGET DATABASE SYSTEM

BACKGROUND

The present invention relates to the field of digital computer systems, and more specifically, to a method for loading data in a target database system.

Data loading is one of the most frequent operations performed in a database system. Improving the data loading may thus improve the overall performance of the database system. However, controlling the time required to perform such data loading may be a challenging task.

SUMMARY

Various embodiments provide a method for loading data in a target database system, computer system and computer program product as described by the subject matter of the independent claims. Advantageous embodiments are described in the dependent claims. Embodiments of the present invention can be freely combined with each other if they are not mutually exclusive.

In one aspect, the invention relates to a computer implemented method for loading data in a target database system. The method comprises: determining that a load of a source table is expected to occur in the target database system; providing a future target table in advance in accordance with a defined table schema; and thereafter receiving a load request for loading the source table; loading data of the source table into the future target table.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer for loading data in a target database system. The computer system is configured for: determining that a load of a source table is expected to occur in the target database system; providing a future target table in advance in accordance with a defined table schema; and thereafter receiving a load request for loading the source table; loading data of the source table into the future target table.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
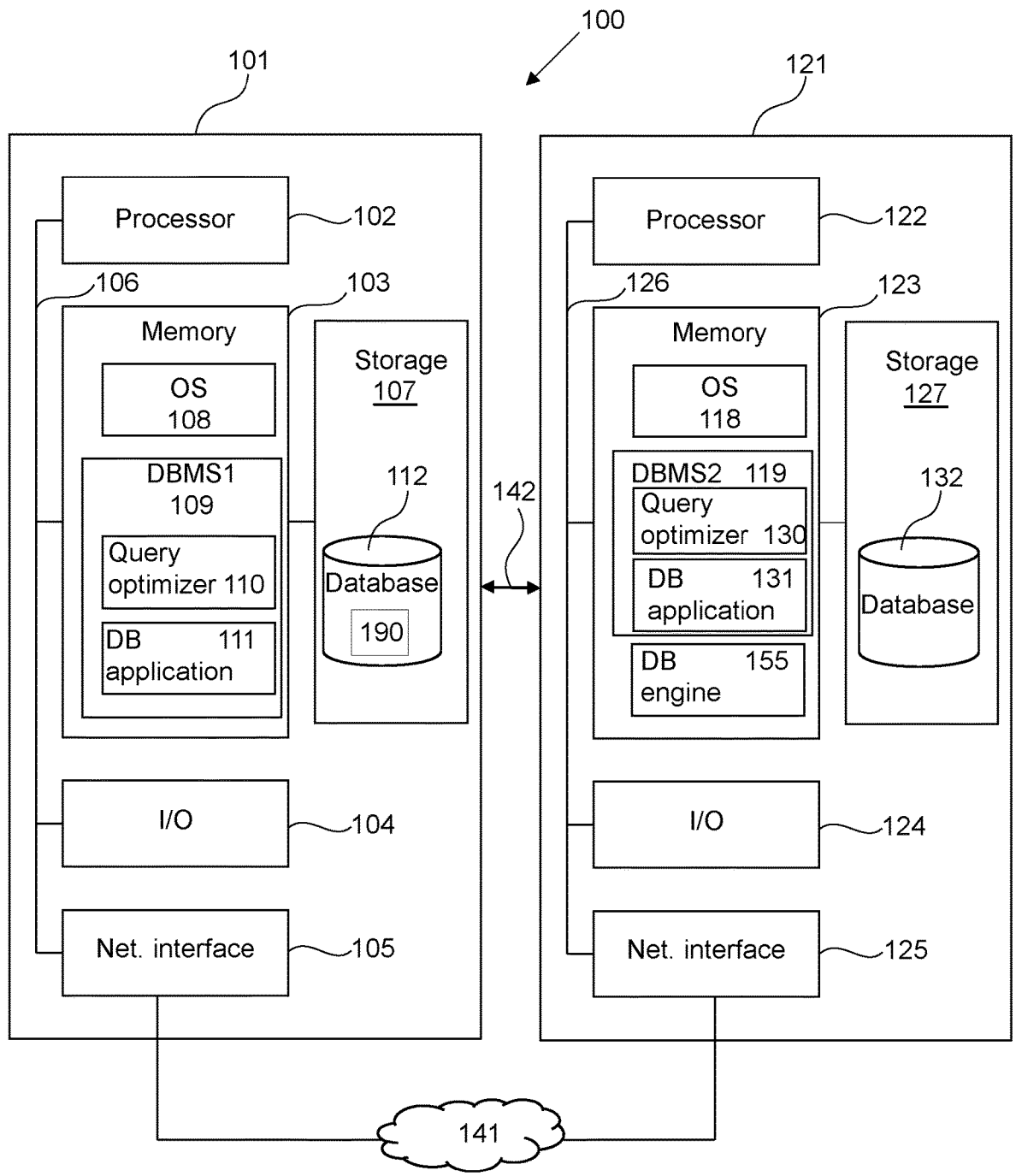
FIG. 1 depicts a data processing system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Data loading into a target database system may comprise extracting data from a table (named "source table") and copying data into a target table of the target database system. The source table may, for example, be a source table in a source database system or an existing table in the target database system. The source table may have a table schema named source table schema and the target table may have a target table schema. The target table schema may be obtained from the source table schema using a defined unique schema mapping that is associated with the source table. In one example, the unique schema mapping may be a 1:1 mapping. That is, the source table and the target table may have the same table schema. A table schema of a table T may indicate the number of columns in the table T. This definition may be sufficient to create a target table and perform a reliable loading of data. In another example, the table schema may further indicate the type of attributes of the table T. This may enable a precise creation or allocation of resources for the target table because the storage resources may be allocated differently depending on the type e.g. float versus integer type of data. In another example, the table schema may further indicate the name of the table. This may prevent data overwriting in the target database system because multiple tables may have the same column definition but different table names.

The data loading may be involved in different types of data loading methods e.g. depending on the context in which the target database system is used. For example, the data loading method comprises steps of the data loading and additional steps depending on the type of the data loading method. One example of the data loading method may be a data reorganization method. The data reorganization method may organize the data in the source table in a different way. The data reorganization may distribute the data across logical nodes of the target database system differently in accordance with a distribution criterion and/or change the physical sort order of the rows in the source table by a different sorting criterion (e.g. sort by name instead of a sort by social security number). For example, the data reorganization method may comprise: upon receiving a request of data reorganization, the target table may be newly created in the target database system, and all rows may be copied from the source table to the target table and the new distribution/sorting criteria are applied in that copying process. In this case, the source and target tables may belong to the target database system. Another example of the data loading method may be a data synchronization method between a source database system and the target database system. Data synchronization may be the process of establishing consistency among data from the source table of the source database system to the target table of the target database system and vice versa. For that, the data synchronization method may detect a change in the source table and thereupon trigger the creation of a new target table in order to move the whole content of the source table (including the change) into the newly created table. That is, several changes in the source table may result in the creation of several target tables respectively. This may enable a continuous harmonization of the data over time. The data synchronization method may comprise an initial load method or a full table reload method. The initial load method refers to the first loading of the data of a source table into the target database system. The table full reload method refers to the subsequent loading of the source table into the target database system in response to a change in the source table.

Hence, regardless of the data loading method being used, the data loading may include the following sequence of operations or steps: s1) creating a target table, s2) extracting all the rows from the source table and inserting them into the target table. The data loading may, in another example, further include the operation of (s3) adapting the application (e.g. a view) accessing at the target database system the content of the initial table so that it references the target table. The time (loading time) needed to complete the data loading may comprise the time to execute each of the three steps s1 to s3. That being said, however, ideally the loading time should be as short as possible e.g. to prevent an inconsistent access to data even for short time. For example, if there are only very few rows in the source table, the overhead for creating the target table in step s1) may become not only noticeable but rather significant. It can dominate the whole process. That's even true if the table creation takes only 30 milliseconds. The present subject matter may reduce the loading time and thus speed up the execution of data loading methods. For that, the target table may prematurely be created in the target database system for subsequent use. That way, an existing target table may be used when needed—without having to create it on-demand. The present subject matter may, for example, configure existing data loading methods so that they do not execute step s1) or they conditionally execute step s1) based on the existence of a suitable target table. This is because step s1) of the data loading may be executed independently of the execution of the data loading method.

The target table may, for example, be provided in advance in response to determining that a load of a source table is expected to occur in the target database system. In one example, the target table schema of the target table may be obtained from the source table schema of the source table using the unique schema mapping and then the target table may be created using the target table schema. In another example, an existing table may be provided as the target table, thus, the target table schema of the target table may be the table schema of the existing table. In another example, the target table schema of the target table may be a user defined table schema e.g. a user may be prompted to provide the target table schema. Accordingly, the created target table is named "future target table". The way of determining that the load may occur in a future point time may depend on the data loading method being used for loading data in the target database system. For example, the data loading method may be analyzed or processed in order to derive how the data loading (steps s1 to s3) is triggered and/or determine the frequency with which the data loading is performed and for which table schemas. Results of the analysis may be used to define the way to determine that the load may occur in a future point time. For example, knowing that a source table $T_s$ is loaded on a daily basis e.g. at 12 AM, the present method may determine at a point of time e.g. 9 AM, that a load of data is expected to occur in the target database system e.g. in a table having a table schema of the source table $T_s$. In another example, and in case of the data synchronization method, the creation of a new source table in the source database system, may indicate that a load of data is expected to occur in the target database system e.g. in a table having a table schema of the source table. This is because, the created source table may inevitably store new data that needs to be propagated to the target database system in an initial load. After the initial load, it is also expected that the source table would change again and thus a new table may be needed to propagate that change. Thus, whenever an operation like "add tables" or "initial load" or "full table reload" finishes, a new target table may be created asynchronously for the next potential execution of the data loading method.

Thus, according to one embodiment, determining that the load of the source table is expected to occur is performed in response to creating the source table in the source database system, wherein the source and target database systems are configured to synchronize data between them, wherein the source table has a source table schema that maps to the defined table schema of the future target table according to the unique schema mapping. This embodiment may, for example, enable a hybrid transactional and analytic processing environment that enables to use data of the source database system in near real-time.

According to one embodiment, determining that the load is expected to occur is performed in response to loading of the source table from the source database system into a current target table of the target database system, wherein the current target table has the defined table schema.

Assuming, for example, that the source database system comprises a source table $T_s$. In response to creating the source table $T_s$, the present subject matter may create in advance a target table $T_g^0$ having a target table schema. The target table schema may, for example, be obtained from the source table schema of the source table $T_s$ using the unique schema mapping. The target table $T_g^0$ may be the current target table associated with the source table $T_s$. The source table may receive an initial content at time $t_0$ and the initial content of the source table $T_s$ may be loaded into the current target table $T_g^0$. This may be referred to as a first or initial load. In response to the first load, the present subject matter may create in advance another target table $T_g^1$ having the table schema of the target table $T_g^0$. The target table $T_g^1$ may become the current target table associated with the source table $T_s$ for the second loading of the source table $T_s$. In case the content of the of the source table $T_s$ changes at time $t_1$, the current content of the table $T_s$ may be loaded into the current created target table $T_g^1$. In response to the second load, the present subject matter may create in advance another future target table $T_g^2$ having the table schema of the target table $T_g^1$. The future target table $T_g^2$ may become the current target table associated with the source table $T_s$ for the third loading of the source table $T_s$. In case the content of the of the source table $T_s$ changes at time $t_2$, the current content of the table $T_s$ may be loaded into the current created target table $T_q^2$ and so on.

According to one embodiment, the method further comprises: repeatedly performing the method, wherein the future target table of the present iteration becomes the current target table for the next iteration.

Following the above example of the source table $T_s$, and in the initial load, the target table $T_g^0$ was the current target table. After the initial load, the created future target table $T_g^1$ becomes the current target table for the second loading (first iteration) of the source table $T_s$. After the second loading of the source table (subsequent to the initial load) the created future target table $T_g^2$ becomes the current target table for the next loading of the source table $T_s$ and so on. This may, for example, result in multiple target tables $T_g^0$, $T_g^1$, $T_g^2$ . . . that correspond to the number of times the source table is loaded into the target database system. This may be advantageous as it may keep track of different versions of the source table at the target database system. These versions may, for example, be useful for time dependent analysis etc. However, this may require storage resources at the target database system. The present subject matter may save the storage resources used by the target tables by using the following embodiment. According to one embodiment, the current target table of the present iteration becomes the future target table of the next iteration. Following the above example, each load (initial or subsequent load) is associated with two tables, the current target table and the created future target table. For example, the first load is associated with the current target table $T_g^0$ and the future target table $T_g^1$. The second load is associated with the current target table $T_g^1$ and the future target table $T_g^2$. The third load is associated with the current target table $T_g^2$ and the future target table $T_g^3$ and so on. With this embodiment, the future target table $T_g^2$ associated with the second load may be provided as the current target table $T_g^0$ of the first load and the future target table $T_g^3$ associated with the third load may be provided as the current target table $T_g^1$ of the second load and so on. In this case only two tables $T_g^0$ and $T_g^1$ may be used for loading the source table in the target database system. In other words, the tables $T_g^0$ and $T_g^1$ swap roles at the end of the load: $T_g^0$ becomes $T_g^1$ while $T_g^1$ becomes $T_g^0$. Thus, only two tables may be created and subsequently, only swapping takes place.

According to one embodiment, the loading of the next iteration comprises considering that the content of the current target table of the present iteration is invisible. Following the above example and as mentioned above, the future target table $T_g^2$ associated with the second load may be provided as the current target table $T_g^0$. However, $T_g^0$ may still have some data. With this embodiment, when loading data into the target table $T_g^2$ (which is $T_g^0$), the content of the table $T_g^0$ may be treated as invisible. This may, for example, be performed by defining for each loading of the source table a respective distinct range of rows of the target table. Thus, the rows where said content is stored are different (and thus invisible to the loading) from the rows where the loading is performed. Alternatively, according to one embodiment, the loading of the next iteration comprises purging the content of the current target table of the present iteration. Following the above example, before loading data into the target table $T_g^2$ (which is $T_g^0$), the content of the table $T_q^0$ may be purged. For example, a SQL statement like TRUNCATE may be used to purge the table's content of the table $T_g^0$. This may be advantageous as the TRUNCATE operation may be a very fast operation because the target database system simply deallocates all pages associated with the table and does not delete individual rows. Another advantage of said operation may be that the metadata in a catalog of the target database system may not have to be modified. This may improve concurrent operations on that metadata catalog.

According to one embodiment, providing the future target table comprises creating an empty table using an asynchronous job. The job is asynchronous with respect to the execution time of the data loading method being used.

According to one embodiment, determining that the load is expected to occur comprises: processing a historical dataset indicative of a history of data loading into the target database system. The historical dataset comprises entries indicating loaded source tables and a time at which said loading is performed, and based on the processing determining that the load is expected to occur. In other words, the historical dataset may keep track of how often a table with a specific schema is needed. That history is consulted and projected into the future to determine when the next table will probably be needed. Thus, it can be created up front. Following the above example, an entry of the historical dataset may comprise the tuple $(T_s, t_0)$, another entry may comprise the tuple $(T_s, t_1)$, another entry may comprise the tuple $(T_a, t_2)$ and so on. Based on the times $t_0$, $t_1$ and $t_2$, a frequency of the loading of the source table $T_s$ may be derived. This frequency may be used to determine that the load of the source table $T_s$ is expected to occur.

According to one embodiment, the processing comprises: grouping the entries per table schema, and using the time behavior of the loading for each group of the groups for determining that the load will occur for the defined table schema. The defined table schema may be the schema of one of the groups whose time behavior indicated that the load is expected to occur. And the source tables expected to be loaded may be source tables of said one group.

Assuming, for example, multiple source tables $T_s^1$, $T_s^2$, . . . $T_s^k$ of the source database system have been loaded into the target database system. Thus, the historical dataset comprises entries associated with each of the source tables such as $(T_s^1, t_0)$, $(T_s^1, t_1)$ . . . $(T_s^2, t_3)$, $(T_s^2, t_9)$ . . . $(T_s^k, t_5)$ etc. The source tables $T_s^1$, $T_s^2$, . . . $T_s^k$ may have table schemas $S_1$, $S_2$, $S_3$ . . . $S_k$ respectively. Each of the table schemas may indicate the number of columns and type of attributes stored therein. A hashing may, for example, be applied for the schema definition of table schemas $S_1$, $S_2$, $S_3$ . . . $S_k$ to enable fast lookup when grouping the entries. This embodiment may enable to group the entries that have the same table schema in the same group. And the entries of each group may be treated coherently as they would represent the same source dataset. In other words, if there are multiple source tables with the same schema (e.g. same column definitions but different table names), their histories can be merged and considered together. This may further reduce the overhead, e.g., in cases where one of those tables is loaded every Monday-Friday, and another table is needed every Saturday and Sunday.

According to one embodiment, the defined table schema of the future target table is obtained from an existing table schema of the source table using a unique mapping. For example, the computer system may get the request to organize the data in the source table in a different way. That could be to distribute the data across the logical nodes of the target database system differently, or it could also be to change the physical sort order of the rows in the source table by different criteria (e.g. sort by name vs. sort by social security number). The future target table is thus created in the target database system, and all rows are copied from the source table to the future target table and the new distribution/sorting criteria are applied in that process. Thus, the reorganization process requires a new table, and creating that table in the target database system would take some time. This embodiment may speed up that process by preparing the target table up-front, e.g. before the request for data reorganization comes in.

FIG. 1 is a block diagram for a data processing system 100 suited for implementing method steps as involved in the disclosure. The data processing system 100 may, for example, comprise IBM Db2 Analytics Accelerator for z/OS (IDAA). The data processing system 100 comprises a source database system 101 connected to a target database system 121. The source database system 101 may, for example, comprise IBM Db2 for z/OS. The target database system 121 may, for example, comprise IBM Db2 Warehouse (Db2 LUW).

Source database system 101 includes processor 102, memory 103, I/O circuitry 104 and network interface 105 coupled together by bus 106.

Processor 102 may represent one or more processors (e.g. microprocessors). The memory 103 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 103 can have a distributed architecture, where various components are situated remote from one another, but can be accessed by the processor 102.

Memory 103 in combination with persistent storage device 107 may be used for local data and instruction storage. Storage device 107 includes one or more persistent storage devices and media controlled by I/O circuitry 104. Storage device 107 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 103 may include one or more separate programs e.g. database management system DBMS1 109, each of which comprises an ordered listing of executable instructions for implementing logical functions, notably functions involved in embodiments of this invention. The software in memory 103 shall also typically include a suitable operating system (OS) 108. The OS 108 essentially controls the execution of other computer programs for implementing at least part of methods as described herein. DBMS1 109 comprises a DB application 111 and a query optimizer 110. The DB application 111 may be configured for processing data stored in storage device 107. The query optimizer 110 may be configured for generating or defining query plans for executing queries e.g. on source database 112. The source database 112 may, for example, comprise a source table 190.

Target database system 121 includes processor 122, memory 123, I/O circuitry 124 and network interface 125 coupled together by bus 126.

Processor 122 may represent one or more processors (e.g. microprocessors). The memory 123 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 123 can have a distributed architecture, where various components are situated remote from one another, but can be accessed by the processor 122.

Memory 123 in combination with persistent storage device 127 may be used for local data and instruction storage. Storage device 127 includes one or more persistent storage devices and media controlled by I/O circuitry 104. Storage device 127 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 123 may include one or more separate programs e.g. database management system DBMS2 129, each of which comprises an ordered listing of executable instructions for implementing logical functions, notably functions involved in embodiments of this invention. The software in memory 123 shall also typically include a suitable OS 128. The OS 128 essentially controls the execution of other computer programs for implementing at least part of methods as described herein. DBMS2 129 comprises a DB application 131 and a query optimizer 130. The DB application 131 may be configured for processing data stored in storage device 127. The query optimizer 130 may be configured for generating or defining query plans for executing queries e.g. on a target database 132.

Source database system 101 and target database system 121 may be independent computer hardware platforms communicating through a high-speed connection 142 or a network 141 via network interfaces 105, 125. The network 141 may, for example, comprise a local area network (LAN), a general wide area network (WAN), and/or a public network (e.g., the Internet). Each of the source and target database systems 101 and 121 may be responsible for managing its own copies of the data.

Although shown in FIG. 1 as separate systems, the source and target database systems may belong to a single system e.g. sharing a same memory and processor hardware, while each of the source and target database systems is associated with a respective DBMS and datasets e.g. the two DBMSs may be stored in the shared memory. In another example, the two database management systems DBMS1 and DBMS2 may form part of a single DBMS that enables communications and method performed by DBMS1 and DBMS2 as described herein. The first and second datasets may be stored on a same storage or on separate storages.

A database engine 155 may be configured to synchronize data between the source and target database systems 101 and 121. The database engine 155 may be configured to perform data migration or data transfer in accordance with the present subject matter. In another example, the database engine 155 may be configured to manage data of one of the two database systems 101 and 121 independently of the other database system. In this case, the data processing system 100 may comprise only said one of the two database systems. Thus, the database engine 155 may be part of the source database system 101 and/or target database system 121 e.g. the database engine 155 may, for example, comprise at least part of the DBMS1 109 and/or DBMS2 119. In another example, the database engine 155 may be or may comprise a separate computer system that is configured to connect to the data processing system 100, wherein the database engine 155 may be configured to control the data processing system 100 to perform at least part of the present method.

Figure 2:
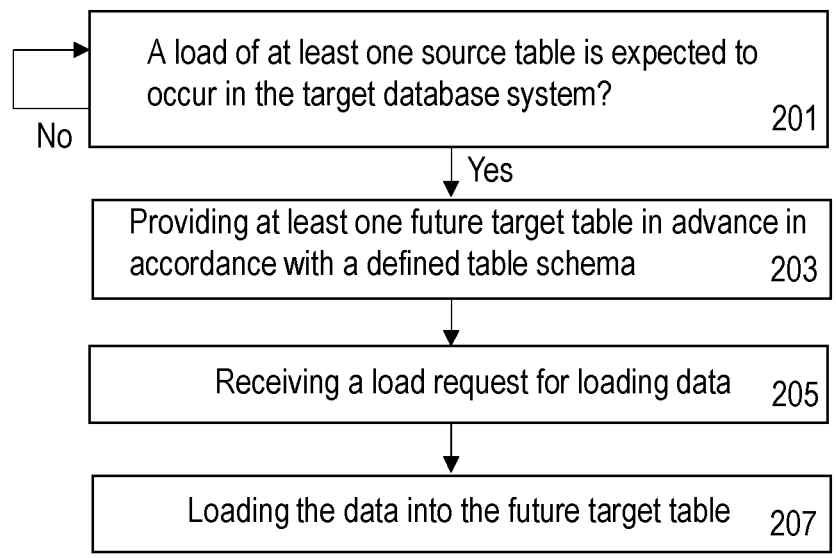
FIG. 2 is a flowchart of a method for loading data in a target database system in accordance with an example of the present subject matter.

FIG. 2 is a flowchart of a method for loading data in a target database system e.g. 121. For the purpose of explanation, the method described in FIG. 2 may be implemented in the system illustrated in FIG. 1, but is not limited to this implementation. The method of FIG. 2 may, for example, be performed by the database engine 155.

It may be determined in step 201 whether a load of at least one source table is expected to occur in the target database system 121. Step 201 may determine whether the load of the source table(s) in the target database system 121 may occur in a future point of time. This determination may be performed in different ways e.g. as described in FIG. 5. In one example, step 201 may determine whether a user input is received, wherein the user input indicates whether the data is to be loaded or not in the target database system.

Step 201 may be performed on predefined source tables. Step 201 may be executed on an existing system or on a newly created system (from scratch). Step 201 may determine whether data of one or more of the source tables is expected to be loaded in the target database system 121. The predefined source tables may be already existing source tables at the time $t_{s201}$ step 201 is performed e.g. the creation dates of the predefined source tables is older than the time $t_{s201}$ and step 201 may determine whether the data is expected to be loaded at a point of time younger than the time $t_{s201}$. The predefined source tables may comprise tables which are not loaded yet into the target database system and/or tables that have been loaded at least one time into the target database system.

In case no load of source tables is expected to occur in the target database system 121, the method may end or step 201 may be repeated until a load of source tables(s) can be expected to occur or until a number of said repetitions of step 201 exceeds a threshold. In case a load of at least one source table is expected to occur in the target database system 121, step 203 may be performed. For example, it may be determined in step 201 that the source tables $T_s^1$, $T_s^2$, ... $T_s^{n_0}$, where $n_0 \geq 1$, are expected to be loaded into the target database system 121 into respective target tables. Index 0 refers to the initial/first execution of steps 201 to 207. The source tables $T_s^1$, $T_s^2$, ... $T_s^{n_0}$ have the table schemas $S_1, S_2 ... S_{n_0}$ respectively. Thus, for each source table of the $n_0$ source tables, a future target table may be provided in step 203 (e.g. at time $t_{s203}$) in the target database system 121 in advance in accordance with the respective defined table schemas $S_1, S_2 ... S_{n_0}$. For example, the future target tables $T_{g,0}^1$, $T_{g,0}^2$, ... $T_{g,0}^{m_0}$ may be provided in step 203 in accordance with the table schemas $S_1, S_2 ... S_{n_0}$ respectively. For each source table identified in step 201, a target table may be provided in step 203 by creating a new empty table or by using an existing table of the target database system as the target table. In case of using the existing table, step 203 may further check whether the table schema of the existing table is the table schema of the source table; if not a new table may be created.

After performing step 203, a load request may be received (e.g. at time $t_{s205}$) in step 205 for loading data. The load request may require loading at least part of (e.g. all of) the source tables $T_s^1$, $T_s^2$, ... $T_s^{n_0}$. For example, the load request may request to load the source tables $T_s^1$, $T_s^2$, ... $T_s^{m_0}$, where $m_0 \leq n_0$. In response to receiving the load request, the data may be loaded in step 207 (e.g. at time $t_{s207}$) into the future target tables $T_{g,0}^1$, $T_{g,0}^2$, ... $T_{g,0}^{m_0}$ associated with the requested source tables respectively. A view may be provided in the target database system. The view may be used to process/analyze the future target tables $T_{g,0}^1$, $T_{g,0}^2$, ... $T_{g,0}^{m_0}$. That is, the view comprises a reference to the target tables $T_{g,0}^1$, $T_{g,0}^2$, ... $T_{g,0}^{m_0}$.

However, it may happen that the table creation in step 203 has not yet completed when the initial load starts in step 207. In one example, the initial load of step 207 may be synchronized with the asynchronous table creation in step 203. In another example, the asynchronous process may create the future target table. If that has not yet completed when the initial load begins, the initial load can create its own, independent future target table and use that. Thus, after the initial load, a new future target table (the one created asynchronously) would already exist and can be used.

In one example, the method of FIG. 2 may be performed in a system having a source and target database systems where the source tables are part of the source database system. The method of FIG. 2 may be implemented in an application—or in the database kernel of said system. The latter case may be beneficial for all applications that work with the database. In another example, the method of FIG. 2 may be performed in a system comprising only the target database system, where the source tables may be part of the target database system. The method of FIG. 2 may thus be used as a data synchronization method or a data reorganization method.

Figure 3:
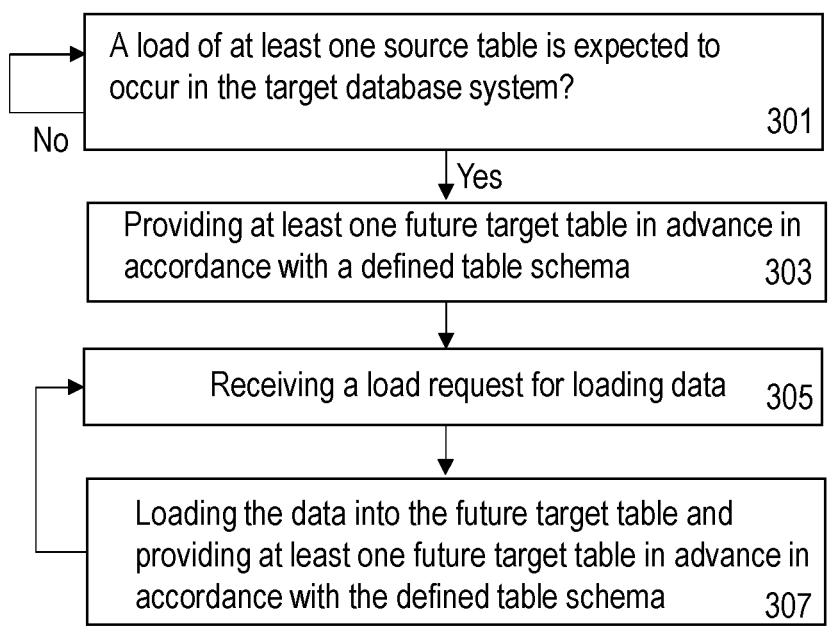
FIG. 3 is a flowchart of a method for loading data in a target database system in accordance with an example of the present subject matter.

FIG. 3 is a flowchart of a method for loading data in a target database system e.g. 121. For the purpose of explanation, the method described in FIG. 3 may be implemented in the system illustrated in FIG. 1, but is not limited to this implementation. The method of FIG. 3 may, for example, be performed by the database engine 155.

Steps 301 to 305 are steps 201 to 205 of the method of FIG. 2. The data of the requested source tables $T_s^1$, $T_s^2$, ... $T_s^{m_0}$ may be loaded into respective (current) target tables $T_{g,0}^1$, $T_{g,0}^2$, ... $T_{g,0}^{m_0}$ and future target tables $T_{g,1}^1$, $T_{g,1}^2$, ... $T_{g,1}^{m_0}$ may be provided in step 307 for enabling a subsequent loading of respective source tables. For example, after loading the data, the future target tables $T_{g,1}^1$, $T_{g,1}^2$, ... $T_{g,1}^{m_0}$ may immediately be provided. The future target tables $T_{g,1}^1$, $T_{g,1}^2$, ... $T_{g,1}^{m_0}$ may have the table schemas of the current target tables $T_{g,0}^1$, $T_{g,0}^2$, ... $T_{g,0}^{m_0}$ respectively. In another example, the future target tables $T_{g,1}^1$, $T_{g,1}^2$, ... $T_{g,1}^{m_0}$ may be provided concurrently with the loading of the source tables $T_s^1$, $T_s^2$, ... $T_s^{m_0}$ in step 307. Thus, for the first execution of steps 301 to 307, the target tables $T_{g,0}^1$, $T_{g,0}^2$, ... $T_{g,0}^{m_0}$ are the current target tables of the source tables $T_s^1$, $T_s^2$, ... $T_s^{m_0}$ respectively and $T_{g,1}^1$, $T_{g,1}^2$, ... $T_{g,1}^{m_0}$ are the future target tables of the source tables $T_s^1$, $T_s^2$, ... $T_s^{m_0}$ respectively.

Additionally, the method steps 305 to 307 may be repeated. The repetition may automatically be performed in response to receiving the load request.

In one example, if the same source tables $T_s^1$, $T_s^2$, ... $T_s^{m_0}$ are requested again to be loaded in step 305 in a subsequent iteration, they may be loaded in step 307 into the corresponding future target tables $T_{g,1}^1$, $T_{g,1}^2$, ... $T_{g,1}^{m_0}$ respectively and future target tables $T_{g,2}^1$, $T_{g,2}^2$, ... $T_{g,2}^{m_0}$ may be provided in step 307 for a subsequent iteration and so on. That is, in the first repetition of steps 305 to 307, the target tables $T_{g,1}^1$, $T_{g,1}^2$, ... $T_{g,1}^{m_0}$ are the current target tables of the source tables $T_s^1$, $T_s^2$, ... $T_s^{m_0}$ respectively and $T_{g,2}^1$, $T_{g,2}^2, \ldots T_{g,2}^{m_0}$ are the future target tables of the source tables $T_s^1, T_s^2, \ldots T_s^{m_0}$ respectively.

In one example, if the requested (to be loaded) source tables $T_s^1, T_s^2, \ldots T_s^{m_0}, T_s^{n_0}$ in step 305 of the first repetition are different (e.g. they comprise the source table $T_s^{n_0}$ in addition) from the previously requested source tables, the target tables $T_{g,1}^1, T_{g,1}^2, \ldots T_{g,1}^{m_0}$ and $T_{g,0}^{n_0}$ are the current target tables of the source tables $T_s^1, T_s^2, T_s^{m_0}$ and $T_s^{n_0}$ respectively (i.e. $T_{g,0}^{n_0}$ is the one provided in step 303 and the remaining ones are provided in step 307) and $T_{g,2}^1, T_{g,2}^2, \ldots T_{g,2}^{m_0}$ and $T_{g,2}^{n_0}$ are the future target tables of the source tables $T_s^1, T_s^2, \ldots T_s^{m_0}$ and $T_s^{n_0}$ respectively. In other words, the loading in step 307 for a given source table is performed in the lastly provided target table for said source table.

For example, the repetition of steps 305 to 307 may be performed until a stopping criterion is fulfilled. The stopping criterion may, for example, require that the number of iterations is smaller than a predefined reload threshold number. The load request received in each iteration of step 305 may or may not require the same source tables to be loaded. The source tables $T_s^1, T_s^2, T_s^{m_j}$, where j varies between 0 and the number of iterations of steps 305 to 307, are requested in each execution of step 305. The requested source tables are part of the source tables identified in step 301.

In a first loading example, the future target tables $T_{g,j}^1, T_{g,j}^2, \ldots T_{g,j}^{m_j}$ may be provided in step 307 by creating new empty tables respectively. In a second loading example, the target tables $T_{g,j}^1, T_{g,j}^2, \ldots T_{g,j}^{m_j}$ may be provided in step 307 using existing tables. For that, each requested source table may be processed using the method steps 1001 to 1007 of FIG. 10 in order to use an existing table or create a new one.

For each requested source table in step 305, two types of target tables may be provided. Namely, the current target table into which the source table is loaded in step 307 and a future target table that is provided in step 307 for a subsequent loading of the source table into the future target table. In a third loading example, only these two tables may be associated with the source table regardless of the number of reload of said source table. For that, a swapping method may be used. For example, in case the source table $T_s^1$ is requested to be loaded in step 305 for the first time, the source table $T_s^1$ may be loaded into the corresponding created (e.g. in step 303) current target table $T_{g,0}^1$ and in addition a future target table $T_{g,1}^1$ may be provided in step 307. In case the source table $T_s^1$ is requested to be loaded in step 305 for the second time, the source table $T_s^1$ may be loaded in the target table $T_{g,1}^1$ and the existing target table $T_{g,0}^1$ may be provided as the future target table in step 307. In case the source table $T_s^1$ is requested to be loaded in step 305 for the third time, the source table $T_s^1$ may be loaded in the target table $T_{g,0}^1$ and the existing target table $T_{g,1}^1$ may be provided as the future target table in step 307 and so on.

After each repetition of steps 305 to 307 and for each source table, the view described with reference to FIG. 2 may be updated so that the reference to the target table associated with the source table is updated to a new target table in case the source table is reloaded into that new target table.

Figure 4:
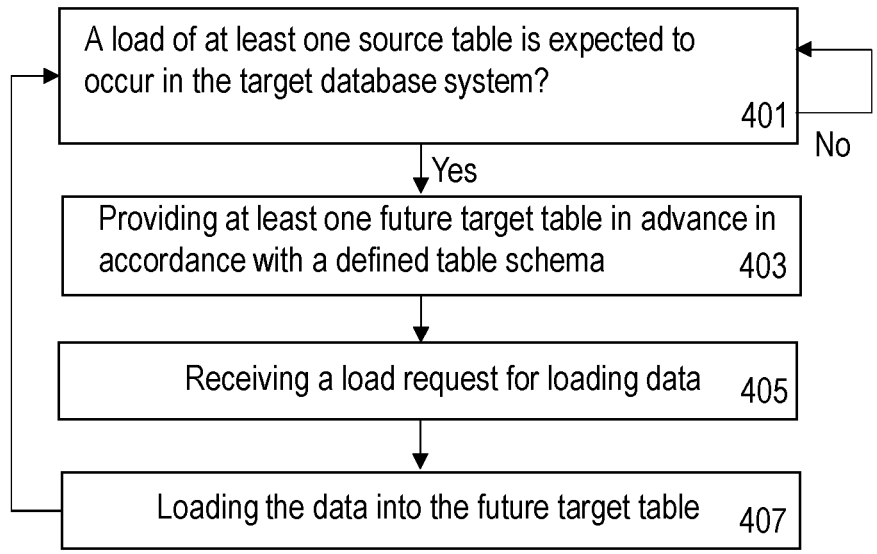
FIG. 4 is a flowchart of a method for loading data in a target database system in accordance with an example of the present subject matter.

FIG. 4 is a flowchart of a method for loading data in a target database system e.g. 121. For the purpose of explanation, the method described in FIG. 4 may be implemented in the system illustrated in FIG. 1, but is not limited to this implementation. The method of FIG. 4 may, for example, be performed by the database engine 155.

Step 401 to 407 of the method of FIG. 4 are the steps 201 to 207 of the method of FIG. 2 respectively. Additionally, the method steps 401 to 407 may be repeated. The repetition may, for example, be performed on a periodic basis e.g. every hour. The repetition may be performed until a stopping criterion is fulfilled. The stopping criterion may, for example, require that the number of iterations is smaller than a predefined threshold.

In the $i^{th}$ repetition of step 401, the source tables $T_s^1, T_s^2, \ldots T_s^{n_i}$ are expected to be loaded, where $n_i \geq 1$ and $n_i$ may or may not be equal to $n_0$ (cf. FIG. 2) and the source tables of the $i^{th}$ repetition may or may not be the same as the source tables $T_s^1, T_s^2, \ldots T_s^{n_0}$ of the initial execution of step 401. The target tables $T_{g,i}^1, T_{g,i}^2, \ldots T_{g,i}^{n_i}$ may be provided in the $i^{th}$ repetition of step 403 for the source tables $T_s^1, T_s^2, \ldots T_s^{n_i}$ respectively so that the source tables may be loaded, upon request, in step 407 into said provided target tables respectively.

For each source table identified in step 401, the provision of the corresponding future target table in step 403 may be performed as describe with reference to FIG. 2. Alternatively, the target table may be provided using the swapping method. That is, for each source table to be loaded only two target tables may be provided. The two target tables may be provided in the first two executions of step 403 for the source table. And any subsequent execution of step 403 for said source table may use one of the two target tables. For example, in case the source table $T_s^1$ is requested to be loaded in step 405 for the first time, the source table $T_s^1$ may be loaded into the corresponding created current target table $T_{g,0}^1$. In case the source table $T_s^1$ is requested to be loaded in step 405 for the second time, the source table $T_s^1$ may be loaded in the target table $T_{g,1}^1$. In case the source table $T_s^1$ is requested to be loaded in step 405 for the third time, the source table $T_s^1$ may be loaded in the target table $T_{g,0}^1$ and so on. This swapping may be advantageous because the loading step 407 of a present iteration may be concurrently performed with the provision of target table in step 403 of the next iteration.

Figure 5:
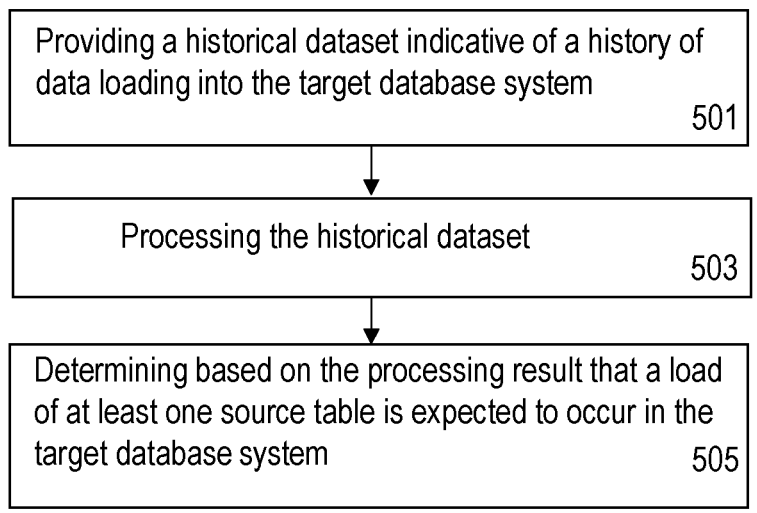
FIG. 5 is a flowchart of a method for determining whether a loading of data may occur in a target database system in accordance with an example of the present subject matter.

FIG. 5 is a flowchart of an example method for implementing step 201 of FIG. 2. For the purpose of explanation, the method described in FIG. 5 may be implemented in the system illustrated in FIG. 1, but is not limited to this implementation. The method of FIG. 5 may, for example, be performed by the database engine 155.

A historical dataset indicative of a history of data loading into the target database system 121 may be provided in step 501. The historical dataset comprises entries indicating source tables that are loaded and a time at which said loading is performed. For example, an entry of the historical dataset may comprise the tuple $(T_s, t_0)$, where $T_s$ is the source table that is loaded at time $t_0$, another entry may comprise the tuple $(T_s, t_1)$, another entry may comprise the tuple $(T_s, t_2)$ and so on.

The historical dataset may be processed or analysed in step 503. For example, a time behaviour of the loading of the source table $T_s$ may be determined. The time behaviour may, for example, indicate the frequency of the loading of the source table $T_s$.

Using the results of the processing, it may be determined in step 505 that a load of at least one source table is expected to occur in the target database system in the target tables having respective table schemas of the source tables $T_s^1, T_s^2, \ldots T_s^{n_0}$.

Figure 6:
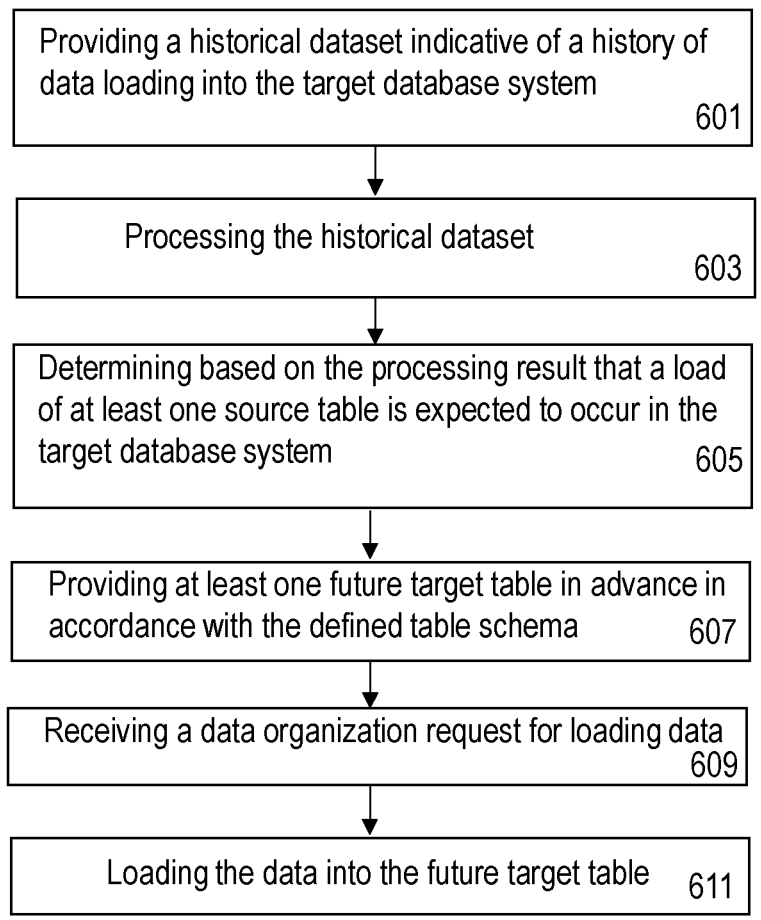
FIG. 6 is a flowchart of a method for loading data in a target database system in accordance with an example of the present subject matter.

FIG. 6 is a flowchart of a method for loading data in a target database system e.g. 121. For the purpose of explanation, the method described in FIG. 6 may be implemented in the system illustrated in FIG. 1, but is not limited to this implementation. The method of FIG. 6 may, for example, be performed by the database engine 155.

Steps 601 to 605 are steps 501 to 505 of FIG. 5 respectively. For each source table of the $n_0$ source tables $T_s^1$, $T_s^2$, ... $T_s^{n_0}$, a future target table may be provided in step 607 in the target database system 121 in advance in accordance with the respective defined table schemas $S_1$, $S_2$ ... $S_{n_0}$ of the source tables $T_s^1$, $T_s^2$, ... $T_s^{n_0}$.

A data reorganization request may be received in step 609. The data reorganization request may require a reorganization of at least part of the source tables $T_s^1$, $T_s^2$, ... $T_s^{n_0}$. For example, the reorganization may distribute the data across logical nodes of the target database system differently in accordance with a distribution criterion and/or change the physical sort order of the rows in the source table by a different sorting criterion (e.g. sort by name instead of a sort by social security number).

The at least part of the source tables $T_s^1$, $T_s^2$, ... $T_s^{n_0}$ may be loaded in step 611 into corresponding target tables in accordance with the reorganization scheme.

Figure 7:
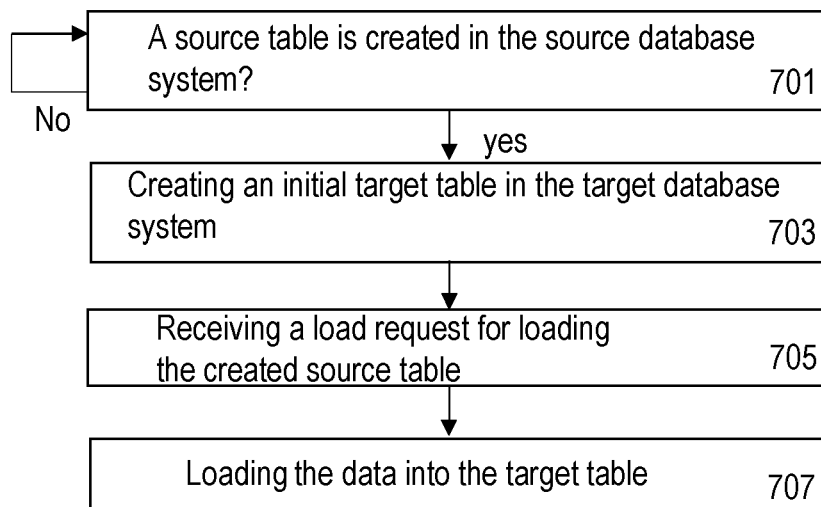
FIG. 7 is a flowchart of a method for loading data in a target database system in accordance with an example of the present subject matter.

FIG. 7 is a flowchart of a method for synchronizing data between a source database system 101 and a target database system 121. For the purpose of explanation, the method described in FIG. 7 may be implemented in the system illustrated in FIG. 1, but is not limited to this implementation. The method of FIG. 7 may, for example, be performed by the database engine 155.

It may be determined in step 701 whether a source table is created in the source database system. The source table may be created by an "add tables" operation. If so, an initial target table may be created in step 703 in the target database system. In case no source table is created in the source database system, the method may end or step 701 may be repeated until a source table is created or until a number of said repetitions of step 701 exceeds a threshold. A load request for loading the source table may be received in step 705. And the content of the source table may be loaded in the initial target table in step 707. Thus, the idea here is to create an empty table after the source table was added. An asynchronous job may take care of that, which can be started based on some timer or by the "add tables" operation. The target table of step 703 is now available for the "initial load" in step 707, which means step s1) for the initial load can be skipped. In case the table creation in step 703 has not yet completed when the initial load starts in step 707, the initial load may have, in one example, to synchronize itself with the asynchronous table creation. That may already be an improvement in the loading time because the table creation can run (at least start) in the time window between the "add tables" and the beginning of the "initial load". In another example, the asynchronous process may create the future target table. If that has not yet completed when the initial load begins, the initial load can create its own, independent future target table and use that. Thus, after the initial load, a new future target table (the one created asynchronously) would already exist and can be used.

Figure 8:
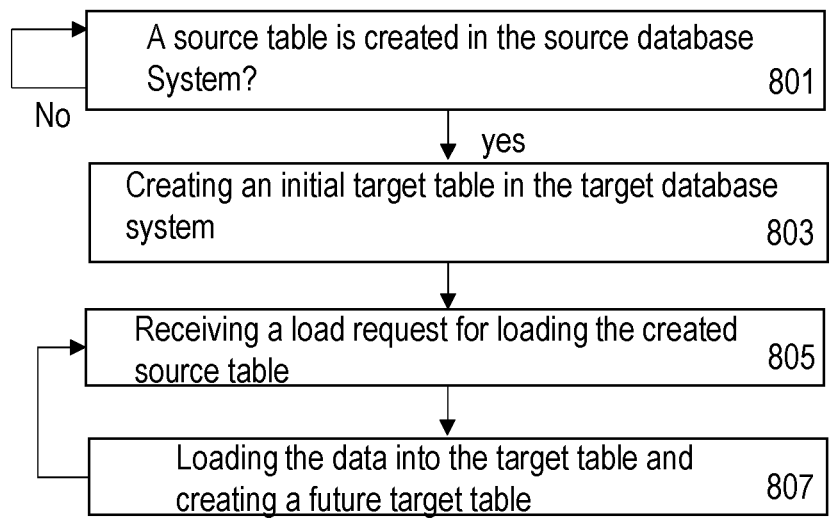
FIG. 8 is a flowchart of a method for loading data in a target database system in accordance with an example of the present subject matter.

FIG. 8 is a flowchart of a method for synchronizing data between a source database system 101 and a target database system 121. For the purpose of explanation, the method described in FIG. 8 may be implemented in the system illustrated in FIG. 1, but is not limited to this implementation. The method of FIG. 8 may, for example, be performed by the database engine 155.

Steps 801 to 805 are steps 701 to 705 of FIG. 7. Step 807 of FIG. 8 is step 707 of FIG. 7 which is modified to further include the provision of the future target table. For example, the future target table may be provided concurrently with the loading of the data in step 807. In another example, the future target table may be provided immediately after the loading of the data in step 807. Additionally, the method steps 805 to 807 may be repeated. The repetition may automatically be performed upon receiving the load request. For example, the repetition may be performed until a stopping criterion is fulfilled. The stopping criterion may, for example, require that the number of iterations is smaller than a predefined reload threshold number. The reloading of the source table in step 807 in a present iteration may, for example, be performed in the last future target table provided in step 807 in a previous iteration for said source table.

The method of FIG. 8 may be advantageous as it may enable to continuously monitor the source table that has been identified in step 801 in order to continuously load its content in accordance with present subject matter.

Figure 9:
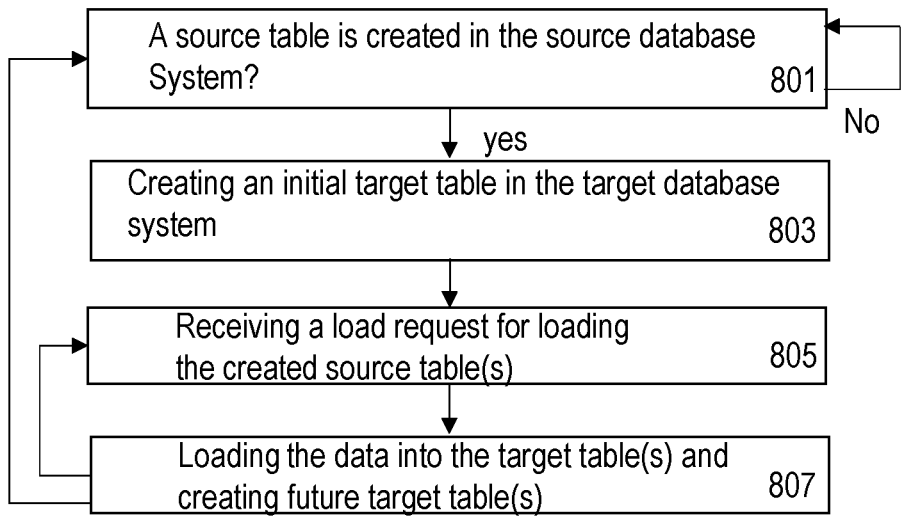
FIG. 9 is a flowchart of a method for loading data in a target database system in accordance with an example of the present subject matter.

FIG. 9 is a flowchart of a method for loading data in target database system in accordance with an example of the present subject matter. For the purpose of explanation, the method described in FIG. 9 may be implemented in the system illustrated in FIG. 1, but is not limited to this implementation. The method of FIG. 9 may, for example, be performed by the database engine 155.

The method of FIG. 9 consists of repeating the method of FIG. 8 for detecting new source tables. The repetition may, for example, be performed on a periodic basis e.g. every hour. The repetition may be performed until a stopping criterion is fulfilled. The stopping criterion may, for example, require that the number of iterations is smaller than a predefined threshold. In this case, the load request received in step 805 may be a load request of one or more source tables that have been determined in step 801, the loading may be performed in corresponding target tables and the creation of future target tables may be performed for the requested source tables respectively. The reloading of each source table in step 807 in a present iteration may, for example, be performed in the last future target table provided in step 807 in a previous iteration for said each source table.

Figure 10:
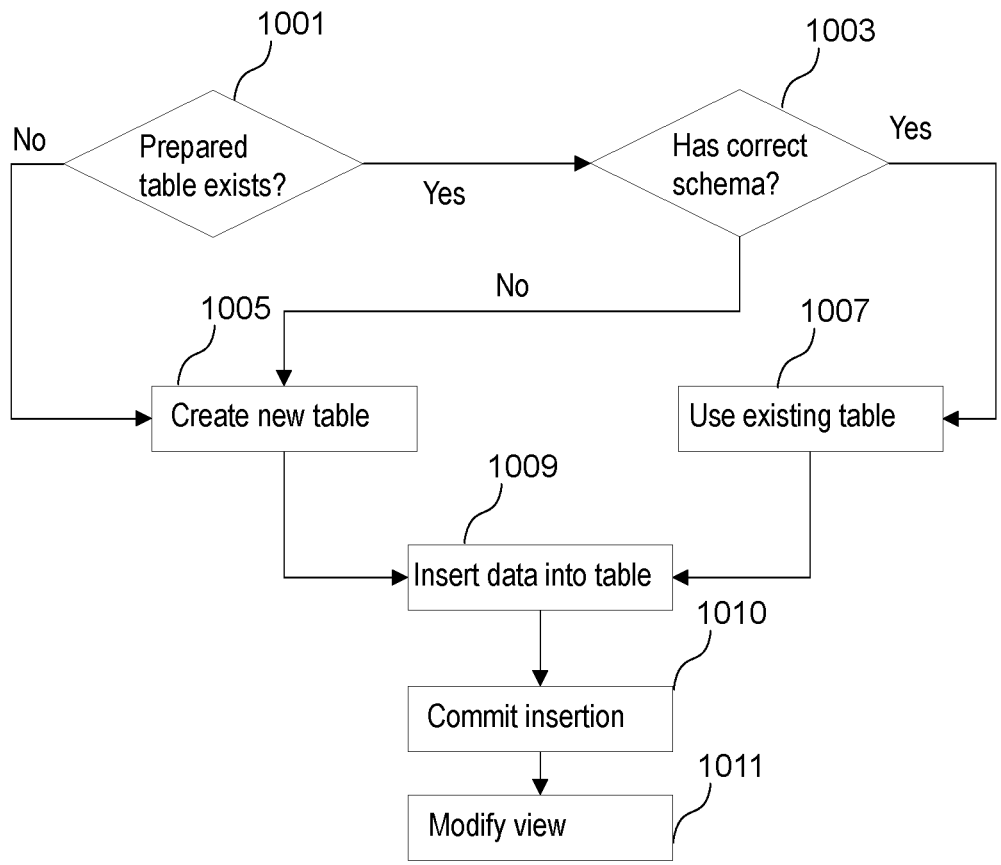
FIG. 10 is a flowchart of a method for loading data in a target database system in accordance with an example of the present subject matter.

FIG. 10 is a flowchart of a method for loading data in target database system in accordance with an example of the present subject matter. For the purpose of explanation, the method described in FIG. 10 may be implemented in the system illustrated in FIG. 1, but is not limited to this implementation. The method of FIG. 10 may, for example, be performed by the database engine 155.

The method of FIG. 10 may, for example, be performed upon receiving a data load request for loading a source table in the target database system 121. It may be determined (step 1001) whether a target table associated with the source table exists. In case the target table associated with the source table exists it may be determined (step 1003) whether the target table has the same table schema as the table schema of the source table. In case the target table has the same table schema as the table schema of the source table, said target table may be used in step 1009. In case the target table does not have the same table schema as the table schema of the source table or the target table does not exist, a new target table may be created in step 1005 and the new created target table may be used in step 1009. In step 1009, the data of the source table may be inserted into the existing target table or the new created target table. The insertion may be committed in step 1010. And a view may be modified in step 1011, wherein the view is modified to refer to the target table used in step 1009. The view is configured to process content of the source table in the target database system.

Figure 11:
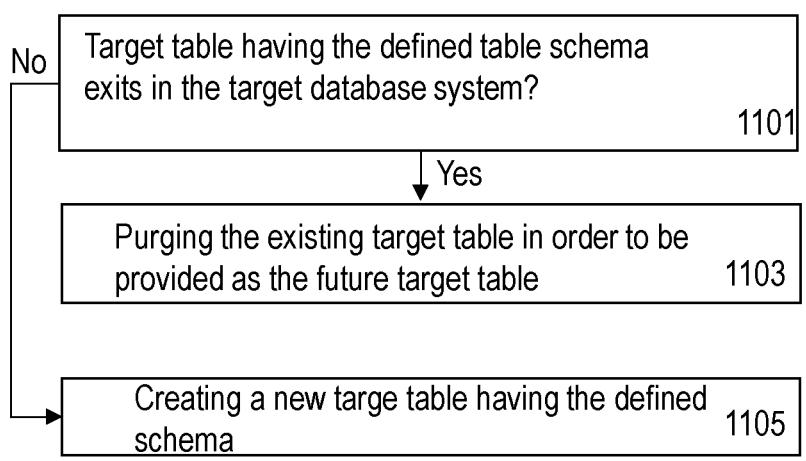
FIG. 11 is a flowchart of a method for providing a target table in accordance with the present subject matter.

FIG. 11 is a flowchart of a method for providing a target table in advance accordance with the present subject matter. For the purpose of explanation, the method described in FIG. 11 may be implemented in the system illustrated in FIG. 1, but is not limited to this implementation. The method of FIG. 11 may, for example, be performed by the database engine 155. The method of FIG. 11 provides an example implementation of step 307.

The method of FIG. 11 may, for example, be performed in response to receiving a data loading request for loading a source table. In step 1101, it may be determined if a target table having a table schema that maps to the table schema of the source table exists e.g. it may be determined whether the schema of the target table is the same as the table schema of the source table. If so, the existing target table may be purged in step 1103 and provided as the future target table so that the source table may be loaded into that target table. Otherwise, a new target table may be created in step 1105. The purging may, for example, advantageously be performed using the TRUNCATE operation.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for loading data in a target database system, the method comprising:
   processing, by one or more computer processors, a historical dataset indicative of a history of data loading into the target database system, the historical dataset comprising entries indicating source tables and a time at which said loading was performed for each entries, and based on the processing, determining, by one or more computer processors, that a loading of a source table is expected to occur in the target database system a future point in time;
   providing, by one or more computer processors, a future target table in advance of the future point of time in accordance with a defined table schema;
   receiving, by one or more computer processors, the load request for loading the source table;
   loading, by one or more computer processors, data of the source table into the future target table, wherein rows for the data in the future target table are defined for each load and different than rows for the data in the source table; and
   repeatedly performing, by one or more computer processors, the method, wherein the future target table target table of the present repletion becomes the current target table of the next repetition and wherein the current target table of the present repetition becomes the future target table of the next iteration.

2. The computer implemented method of claim 1, wherein determining that the loading is expected to occur is performed in response to:
   creating, by one or more computer processors, the source table in a source database system, wherein the source and target database systems are configured to synchronize data between each other, wherein the source table has the defined table schema.

3. The computer implemented method of claim 1, wherein the processing comprises:
   grouping, by one or more computer processors, the entries per table schema, and using the time behavior of the data loading of each group of the groups for the determining, by one or more computer processors, that the loading is expected to occur, wherein the defined table schema is the table schema of one of the groups.

4. The computer implemented method of claim 1, wherein the defined table schema of the future target table is obtained from a table schema of the source table using a unique mapping.

5. The computer implemented method of claim 1, wherein the loading step of the next repetition comprises purging the content of the current target table of the present repetition.

6. The method of claim 1, wherein providing the future target table comprises creating an empty table using an asynchronous job.

7. The computer implemented method of claim 1, wherein determining that the loading is expected to occur is performed in response to:
   loading, by one or more computer processors, data of the source table from the source database system into a current target table of the target database system, wherein the current target table has the defined table schema.

8. The computer implemented method of claim 1, wherein loading the data of the source table into the future target table comprises: extracting data from the source table, inserting the extracted data in the target table, performing a commit operation, and modifying a view in the target database such that it refers to the future target table, the view being configured to process content of the source table in the target database system.

9. A computer program product for loading data in a target database system, the computer program product comprising:
   one or more computer readable storage media; and
   program instructions stored on the one or more computer readable storage media, the program instructions comprising:
      program instructions to process a historical dataset indicative of a history of data loading into the target database system, the historical dataset comprising entries indicating source tables and a time at which said loading was performed for each entries, and based on the program instructions to process, program instructions to determine that a loading of a source table is expected to occur in the target database system a future point in time;
      program instructions to provide a future target table in advance of the future point of time in accordance with a defined table schema;
      program instructions to receive a load request for loading the source table;
      program instructions to load data of the source table into the future target table, wherein rows for the data in the future target table are defined for each load and different than rows for the data in the source table; and
      program instructions to repeatedly performing the program instructions, wherein the future target table target table of the present repletion becomes the current target table of the next repetition and wherein the current target table of the present repetition becomes the future target table of the next iteration.

10. The computer program product of claim 9, wherein the program instructions to determine that the load is expected to occur is performed in response to:
    program instructions to create the source table in a source database system, wherein the source and target database systems are configured to synchronize data between each other, wherein the source table has the defined table schema.

11. The computer program product of claim 9, wherein the program instructions to determine that the load is expected to occur is performed in response to:
    program instructions to load data of the source table from the source database system into a current target table of the target database system, wherein the current target table has the defined table schema.

12. The computer program product of claim 9, wherein providing the future target table comprises creating an empty table using an asynchronous job.

13. A computer system for loading data in a target database system, the computer system comprising:
- one or more computer processors;
- one or more computer readable storage media; and
- program instructions, stored on the one or more computer readable storage media for execution by at least one of the one or more computer processors, the program instructions comprising:
  - program instructions to process a historical dataset indicative of a history of data loading into the target database system, the historical dataset comprising entries indicating source tables and a time at which said loading was performed for each entries, and based on the program instructions to process, program instructions to determine that a loading of a source table is expected to occur in the target database system a future point in time;
  - program instructions to provide a future target table in advance of the future point of time in accordance with a defined table schema;
  - program instructions to receive a load request for loading the source table;
  - program instructions to load data of the source table into the future target table, wherein rows for the data in the future target table are defined for each load and different than rows for the data in the source table; and
  - program instructions to repeatedly performing the program instructions, wherein the future target table target table of the present repletion becomes the current target table of the next repetition and wherein the current target table of the present repetition becomes the future target table of the next iteration.

14. The computer system of claim 13, wherein the program instructions to determine that the load is expected to occur is performed in response to:
- program instructions to create the source table in a source database system, wherein the source and target database systems are configured to synchronize data between each other, wherein the source table has the defined table schema.

15. The computer system of claim 13, wherein the program instructions to determine that the load is expected to occur is performed in response to:
- program instructions to load data of the source table from the source database system into a current target table of the target database system, wherein the current target table has the defined table schema.

16. The computer system of claim 13, wherein providing the future target table comprises creating an empty table using an asynchronous job.

* * * * *